US012797892B2

(12) United States Patent
Lee et al.

(10) Patent No.: US 12,797,892 B2
(45) Date of Patent: Nov. 17, 2026

(54) ELECTRODE SLURRY COATING APPARATUS AND METHOD CAPABLE OF MEASURING REMAINING OIL LEVEL

(71) Applicant: LG Energy Solution, Ltd., Seoul (KR)

(72) Inventors: Sang Myeon Lee, Daejeon (KR); Ki Tae Kim, Daejeon (KR); Ki Hoon Paeng, Daejeon (KR); Jae Won Moon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 372 days.

(21) Appl. No.: 17/914,884

(22) PCT Filed: Nov. 17, 2021

(86) PCT No.: PCT/KR2021/016891
§ 371 (c)(1),
(2) Date: Sep. 27, 2022

(87) PCT Pub. No.: WO2022/131580
PCT Pub. Date: Jun. 23, 2022

(65) Prior Publication Data

US 2023/0121300 A1 Apr. 20, 2023

(30) Foreign Application Priority Data

Dec. 17, 2020 (KR) ........................ 10-2020-0177350

(51) Int. Cl.
*B05C 11/10* (2006.01)
*H01M 4/04* (2006.01)
(Continued)

(52) U.S. Cl.
CPC ....... *B05C 11/1015* (2013.01); *H01M 4/0404* (2013.01); *G01N 2013/0208* (2013.01);
(Continued)

(58) Field of Classification Search
USPC ........ 118/300, 325, 401, 410, 419, 712, 713
See application file for complete search history.

(56) References Cited

U.S. PATENT DOCUMENTS

2010/0024529 A1* 2/2010 Dillingham ............ G01N 13/02 73/64.52
2011/0108478 A1* 5/2011 Taguchi ................. B01D 69/08 524/508
(Continued)

FOREIGN PATENT DOCUMENTS

CN 106784627 A 5/2017
CN 107851840 A 3/2018
(Continued)

OTHER PUBLICATIONS

English translation of JP2012230778.*
(Continued)

*Primary Examiner* — Yewebdar T Tadesse
(74) *Attorney, Agent, or Firm* — Lerner David LLP

(57) ABSTRACT

An apparatus and method for coating an electrode slurry are disclosed herein. In some embodiments, the apparatus includes a coater configured to coat an electrode slurry on a metal foil, a measuring unit is configured to measure a remaining oil level on a surface of the metal foil before the coater coating the electrode slurry, and a controller configured to control the coater to coat the electrode slurry based on a measurement value of the remaining oil level of the surface of the metal foil.

6 Claims, 5 Drawing Sheets

(51) Int. Cl.
*G01N 13/02* (2006.01)
*G01N 21/88* (2006.01)
*G01N 21/94* (2006.01)

(52) U.S. Cl.
CPC ................ *G01N 2021/8887* (2013.01); *G01N 2021/945* (2013.01)

(56) References Cited

U.S. PATENT DOCUMENTS

| | | | | |
|---|---|---|---|---|
| 2015/0166307 | A1* | 6/2015 | Yu | B05D 3/10 427/299 |
| 2016/0214144 | A1* | 7/2016 | Swanberg | B25J 11/0085 |
| 2017/0338493 | A1 | 11/2017 | Shin et al. | |
| 2019/0232328 | A1* | 8/2019 | Hatanaka | B05D 3/0272 |

FOREIGN PATENT DOCUMENTS

| | | | | |
|---|---|---|---|---|
| CN | 110411913 | A | 11/2019 | |
| EP | 3539673 | A1 * | 9/2019 | B25J 19/02 |
| JP | H07260687 | A | 10/1995 | |
| JP | 2004212113 | A * | 7/2004 | |
| JP | 2005222936 | A | 8/2005 | |
| JP | 4646505 | B2 | 3/2011 | |
| JP | 2012230778 | A | 11/2012 | |
| JP | 2014099371 | A * | 5/2014 | |
| JP | 2018018681 | A | 2/2018 | |
| JP | 2019050172 | A | 3/2019 | |
| JP | 2020009714 | A | 1/2020 | |
| KR | 20080022992 | A | 3/2008 | |
| KR | 20160033482 | A | 3/2016 | |
| KR | 20170131972 | A | 12/2017 | |
| KR | 20190036976 | A | 4/2019 | |

OTHER PUBLICATIONS

Search Opinion of PCT Application.*
International Search Report for PCT/KR2021/016891 mailed Mar. 4, 2022. 3 pgs.
Search Report dated Jan. 13, 2025 from the Office Action for Chinese Application No. 202180024672.4 Issued Jan. 17, 2025, pp. 1-2. [See p. 1, categorizing the cited references].

* cited by examiner

【FIG. 1】
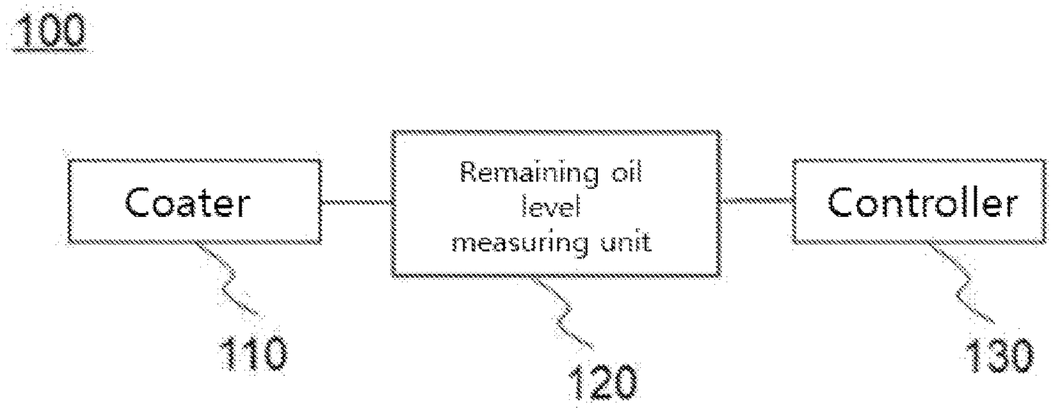

【FIG. 2A】
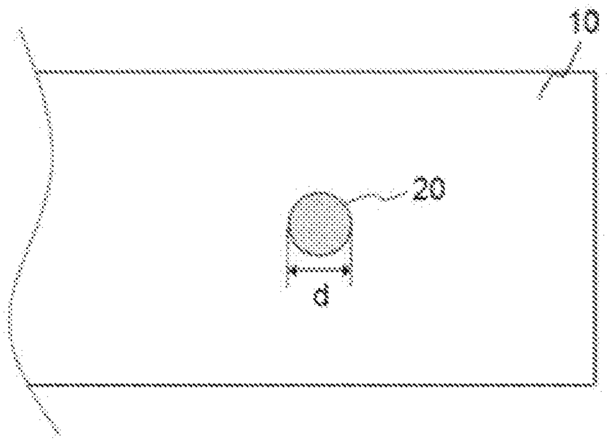
【FIG. 2B】
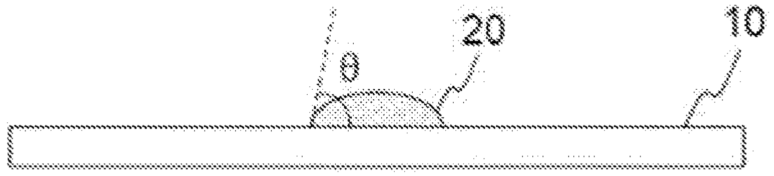

【FIG. 3】
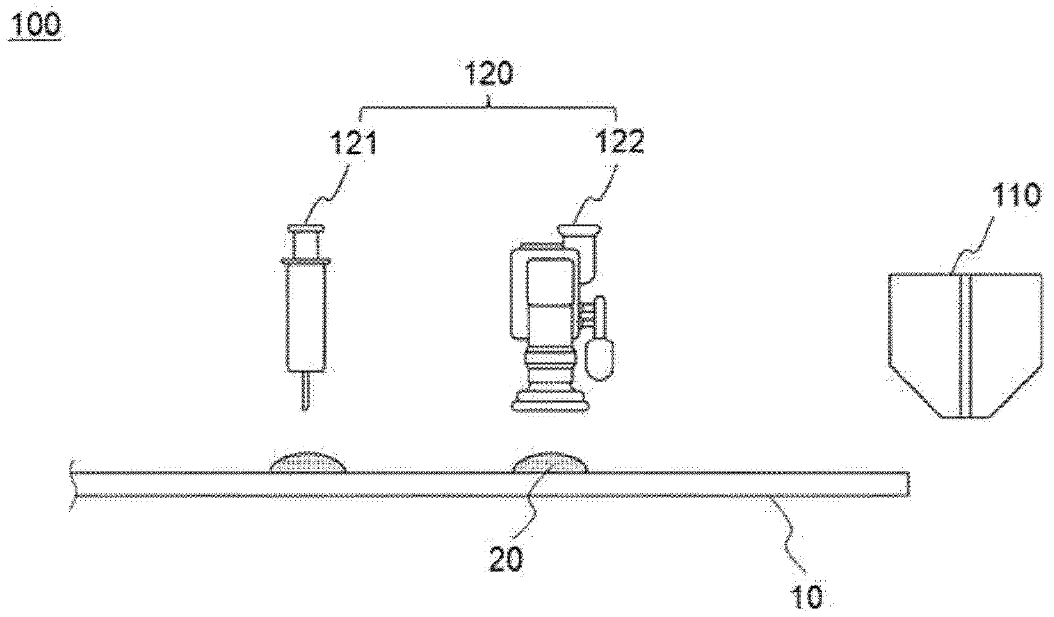
【FIG. 4】
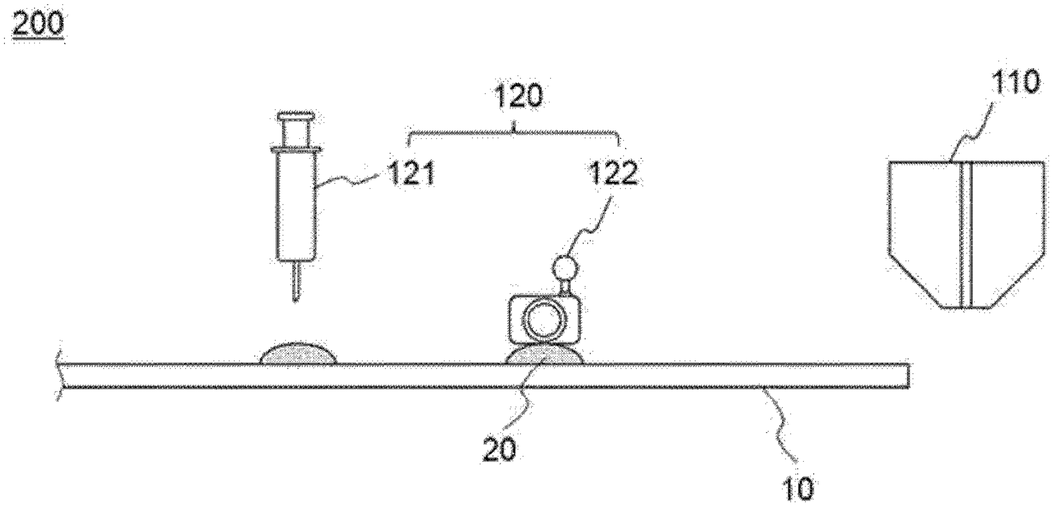

【FIG. 5】
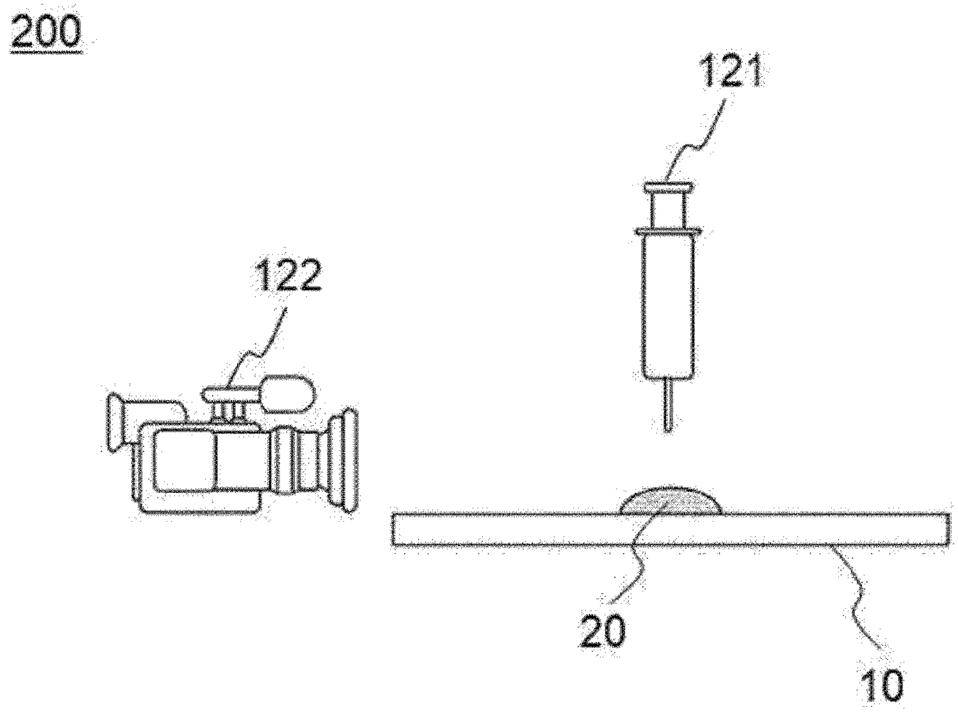
【FIG. 6】
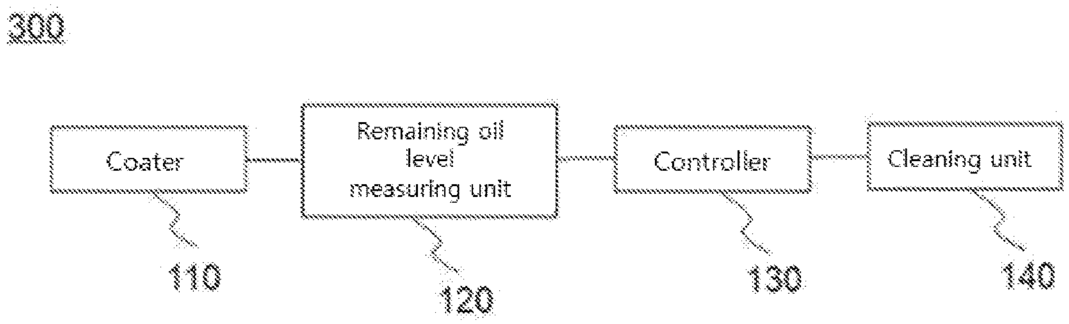

【FIG. 7】
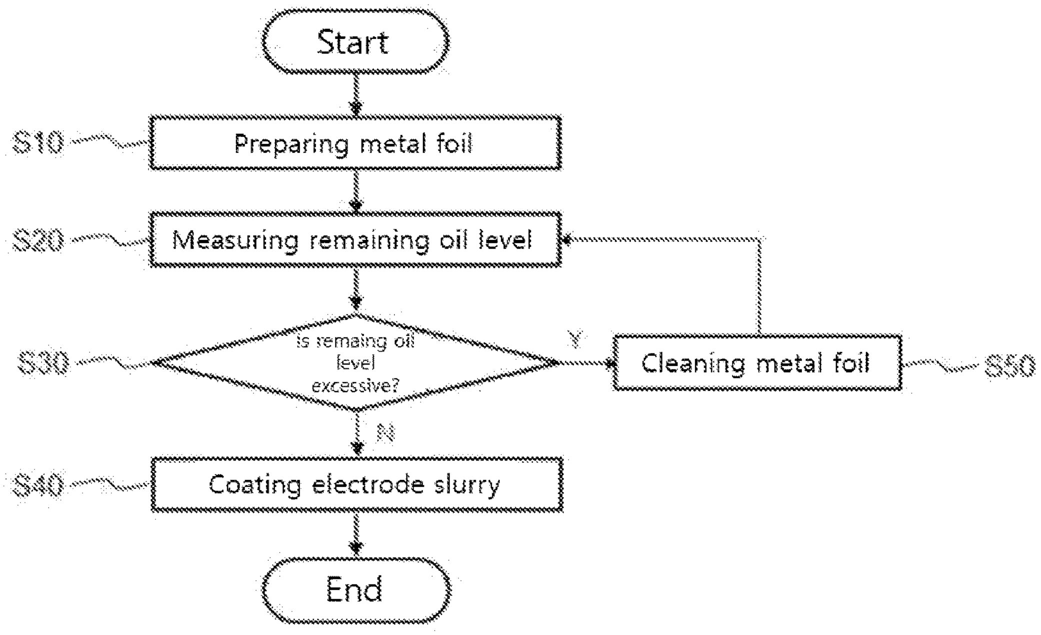

ELECTRODE SLURRY COATING APPARATUS AND METHOD CAPABLE OF MEASURING REMAINING OIL LEVEL

CROSS-REFERENCE TO RELATED APPLICATIONS

This application is a national phase entry under 35 U.S.C. § 371 of International Application No. PCT/KR2021/016891, filed on Nov. 17, 2021, which claims the benefit of priority from Korean Patent Application No. 10-2020-0177350, filed on Dec. 17, 2020, and the entire contents of which are incorporated by reference herein.

TECHNICAL FIELD

The present disclosure relates to an electrode slurry coating apparatus and method, and more particularly, to an electrode slurry coating apparatus and method capable of measuring a remaining oil level.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type in which a positive electrode and a negative electrode which are long sheet-shaped and are coated with active materials are wound with a separator interposed therebetween, and a stack type in which a plurality of positive electrodes and negative electrodes of a predetermined size are sequentially stacked while a separator is interposed therebetween.

Further, the electrode included in the secondary battery may be manufactured by coating an electrode slurry including an electrode active material on a current collector, and a metal foil made of aluminum or copper may be used as the current collector.

Such a metal foil may go through the rolling process in order to planarize the surface. In this process, rolling oil is used for lubrication. As such, rolling oil elements remain on the metal foil after the rolling process. Likewise, when there is remaining oil on the metal foil, a collapsed or disconnected phenomenon of the electrode slurry may occur during the coating of the electrode slurry.

Conventionally, a dyne test was performed to measure the remaining oil level on the metal foil used as the current collector. This is a scheme of a broken degree of a liquid film by coating a reagent like 2-ethoxyethanol on a metal foil. However, in a conventional dyne test scheme, there may be an error in the measured remaining oil level due to the difference in the reagent or contamination of the reagent.

Therefore, there is a need for a technology for accurately recognizing the remaining oil level.

DISCLOSURE

Technical Problem

The present disclosure is believed to solve at least some of the above problems. For example, an aspect of the present disclosure provides an electrode slurry coating apparatus and method for accurately recognizing the remaining oil level on the surface of a metal foil used as a current collector.

Technical Solution

An apparatus for coating an electrode slurry according to the present disclosure includes: a coater configured to coat an electrode slurry on a metal foil; a measuring unit configured to measure a remaining oil level on a surface of the metal foil before the coater coats the electrode slurry; and a controller configured to control the coater to coat the electrode slurry based on a measurement value of the remaining oil level on the surface of the metal foil.

In a specific example, the measuring unit may measure at least one of a spread degree and a contact angle of the electrode slurry dropped on the metal foil.

More specifically, the measuring unit includes: a syringe which drops an electrode slurry on a metal foil; and a vision camera which photographs shapes of the electrode slurry dropped by the syringe, collects images obtained by photographing the shapes of the electrode slurry, and measures at least one of a spread degree or a contact angle of the dropped electrode slurry from the photographed images.

At this time, the vision camera senses the metal foil shown on an image and at least one of color, brightness, and chroma of the dropped electrode slurry, and measures a diameter or a contact angle of the dropped electrode slurry.

In a specific example, the syringe and the vision camera are positioned on the upper side of the coater on the basis of the coating direction, and the syringe is positioned on the upper side of the vision camera on the basis of the coating direction.

In a specific example, the controller compares the measured spread degree or contact angle of the electrode slurry with a reference value, and when the measured spread degree is less than the reference value or the measured contact angle exceeds the reference value, it may be determined that the remaining oil level is excessive.

At this time, when the remaining oil level on the surface of the metal foil is within a predetermined range, the controller may control the coater to discharge the electrode slurry.

Further, the electrode slurry coating apparatus according to the present disclosure may further include a cleaning unit which cleans the metal foil.

The controller may transfer the metal foil, which has been determined to have an excessive remaining oil level on the surface, to the cleaning unit to allow the metal foil to be cleaned.

As such, the measuring unit may remeasure the remaining oil level for the cleaned metal foil, and the controller may redetermine whether to coat an electrode slurry on the cleaned metal foil.

Further, the present disclosure provides a method of coating an electrode slurry.

The method of coating an electrode slurry according to the present disclosure includes: preparing a metal foil for an electrode current collector; measuring a remaining oil level of the metal foil; and coating an electrode slurry on the metal foil based on the measured remaining oil level.

In a specific example, during the measuring of remaining oil level of the metal foil, the measuring unit measures at least one of a spread degree and a contact angle of the electrode slurry dropped on the metal foil.

At this time, the measuring of the remaining oil level of the metal foil may be performed prior to coating the electrode slurry.

In a specific example, the measuring of the remaining oil level of the metal foil may be performed by dropping an electrode slurry on a surface of the metal foil by the syringe, photographing shapes of the electrode slurry dropped by the syringe using a vision camera, collecting images obtained by photographing the shapes of the electrode slurry, and then measuring at least one of a spread degree and a contact angle of the electrode slurry from the images.

The vision camera may sense the metal foil and at least one of color, brightness, and chroma of the dropped electrode slurry in the images, and measure a diameter or a contact angle of the dropped electrode slurry.

Further, when the spread degree is less than the reference value or the contact angle exceeds the reference value, it may be determined that the remaining oil level is excessive.

When it is determined that the remaining oil level on the surface of the metal foil is excessive, the method may further include cleaning the metal foil.

Further, the electrode slurry coating method according to the present disclosure may further include remeasuring the remaining oil level for the cleaned metal foil, and redetermining whether to coat an electrode slurry on the cleaned metal foil.

Advantageous Effects

According to the present disclosure, it is possible to more accurately recognize the remaining oil level on the metal foil by dropping an electrode slurry on a metal foil before coating the electrode slurry and measuring the spread degree and a contact angle of the dropped electrode slurry.

BRIEF DESCRIPTION OF THE DRAWINGS

FIG. 1 is a block diagram showing a configuration of an electrode slurry coating apparatus according to the present disclosure.

FIGS. 2A and 2B show top down and side schematic views, respectively, of the shape of an electrode slurry dropped on a metal foil.

FIG. 3 is a schematic diagram showing an electrode slurry coating apparatus according to an embodiment of the present disclosure.

FIGS. 4 and 5 each are a schematic diagram showing an electrode slurry coating apparatus according to another embodiment of the present disclosure.

FIG. 6 is a block diagram showing the configuration of an electrode slurry coating apparatus according to further another embodiment of the present disclosure.

FIG. 7 is a flowchart illustrating an order of an electrode slurry coating method according to the present disclosure.

DETAILED DESCRIPTION OF THE PREFERRED EMBODIMENTS

Hereinafter, the present disclosure will be described in detail with reference to the drawings. The terms and words used in the present specification and claims should not be construed as limited to ordinary or dictionary terms and the inventor may properly define the concept of the terms in order to best describe its disclosure. The terms and words should be construed as meaning and concept consistent with the technical idea of the present disclosure.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present disclosure will be described in detail with reference to the drawings.

FIG. 1 is a block diagram showing a configuration of an electrode slurry coating apparatus according to the present disclosure.

Referring to FIG. 1, an electrode slurry coating apparatus 100 according to the present disclosure includes: a coater 110 which coats an electrode slurry on a metal foil; a remaining oil level measuring unit 120 which measures a remaining oil level of a surface of the metal foil before coating the electrode slurry; and a controller 130 which determines whether the remaining oil level is excessive from a measurement value of the remaining oil level, and determines whether to coat the electrode slurry therefrom.

According to the present disclosure, it is possible to more accurately recognize the remaining oil level on the metal foil by dropping an electrode slurry on a metal foil before coating the electrode slurry and measuring the spread degree and a contact angle of the dropped electrode slurry.

FIG. 3 is a schematic diagram showing an electrode slurry coating apparatus according to an embodiment of the present disclosure.

Referring to FIG. 3 together with FIG. 1, the electrode slurry coating apparatus 100 according to the present disclosure includes a coater 110 which coats an electrode slurry 20 on a metal foil 10. The coater 110 may be positioned to be spaced apart from the metal foil 10 by a predetermined distance. Various types of coater 110 may be used. Specifically, a slot die type, in which a discharge port, through which an electrode slurry is discharged, is formed in a slit shape along the coating width, may be used. In this case, the coater may include a main body and a tip formed on the lower surface of the main body. A discharge path, on which the supplied electrode slurry may be moved, is formed at the main body, and a discharge port, through which the electrode slurry is discharged, may be formed at the end of the tip. The discharge port may have a slit shape extended in the width direction along the end of the tip, and the thickness may be adjusted according to the thickness of the electrode slurry coated on the metal foil. Further, the electrode slurry 10 is stored in a separate slurry supply tank (not shown), and the electrode slurry 10 may be supplied to the coater 110 through a supply pipe connected to the coater 110. Other details about the coater 110 are known to those of ordinary skill in the art, and thus detailed description thereof will be omitted.

Further, the metal foil 10 may be in a state that has been wound on a separate roll or has gone through a rolling process, and when the coating is started, the metal foil 10 is unwound and is supplied to the coater.

The metal foil 10 may be what is used as a positive electrode current collector or a negative electrode current collector.

In the present disclosure, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

Further, the electrode slurry 20 includes an electrode active material and a solvent and may further include a conductive material and a binder in addition to an electrode active material.

In the present disclosure, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3$ ($0 \leq x \leq 1$), $Li_xWO_2$($0 \leq x \leq 1$), $Sn_xMe_{1-x}Me'_yO_z$ (Me: Mn, Fe, Pb, Ge; Me': Al, B, P, Si, groups 1, 2, and 3 of the periodic table, halogen; $0 \leq x \leq 1$; $1 \leq y \leq 3$; $1 \leq z \leq 8$); lithium alloy; silicon alloy; tin alloy; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers and the like.

The type of the solvent is not particularly limited as long as it is capable of dispersing an electrode active material, and either an aqueous solvent or a non-aqueous solvent may be used. For example, the solvent may be a solvent generally used in the art, such as dimethyl sulfoxide (DMSO), isopropyl alcohol, N-methylpyrrolidone (NMP), acetone, or water, and one of them alone or a mixture of two or more may be used. The amount of the solvent used may be such that the slurry can be adjusted to have an appropriate viscosity in consideration of the coating thickness, production yield, and workability of the slurry, and is not particularly limited.

Further, in the present disclosure, the metal foil 10 may be made of aluminum as what is used as a positive electrode current collector. Likewise, the electrode slurry 20 is obtained as a positive electrode active material, a conductive material and a binder are disperse in a solvent. Herein, for example, NMP may be used as the solvent.

Further, referring to FIGS. 1 and 2A-2B together with FIG. 3, the remaining oil level measuring unit 120 measures a remaining oil level of a surface of the metal foil 10 before coating the electrode slurry 20.

In one example, the remaining oil level measuring unit 120 measures the spread degree of the electrode slurry 20 dropped on the metal foil 10. The spread degree means a degree to which a liquid phase material is spread on a solid phase material when the liquid phase material contacts the solid phase material. The spread degree is related with the affinity between the liquid phase material and the solid phase material. For example, when the affinity between a liquid phase material and a solid phase material is high, the liquid phase material is widely spread on the solid phase material, which means that the surface free energy level of the solid phase material is high. On the other hand, when the affinity between the liquid phase material and the solid phase material is low, the contact area between the liquid phase material and the solid phase material is small, which means that the surface free energy level of the solid phase material is low.

In the present disclosure, a non-aqueous solvent having a little polarity like NMP is used as a solvent in the electrode slurry 20. Further, oil remaining on the metal foil 10 is generally non-polar. As such, when the remaining oil level on the surface of the metal foil 10 is large, the affinity between the electrode slurry 20 and the metal foil 10 is low, and accordingly, the spread degree becomes relatively small. On the contrary, when the remaining oil level on the surface of the metal foil 10 is large, the affinity between the electrode slurry 20 and the metal foil 10 becomes large and accordingly, the spread degree also increases. Likewise, according to the present disclosure, it is possible to recognize and control the remaining oil level on the surface of the metal foil 10 from the affinity between the electrode slurry 20 and the metal foil 10.

Referring to FIG. 3, in the electrode slurry coating apparatus 100 according to the present disclosure, the remaining oil level measuring unit 120 includes a syringe 121 and a vision camera 122.

The syringe 121 drops an electrode slurry 20 on a metal foil 10. There is no limitation to the shape and the size of the syringe 121 as long as it can drop the electrode slurry 20. Herein, when the size of the syringe is too large, control is difficult, and when the diameter of the tip portion, at which an electrode slurry is discharged at the end portion of the syringe, becomes large, the size of the electrode slurry becomes large, which may form a step at the dropped portion at the time of coating an electrode slurry by a coater. Hence, a size, at which the spread degree can be observed, is sufficient. For example, the volume of the syringe may be in the range of 0.1 to 5 mL and specifically 0.1 to 1 mL.

Likewise, the distance between the syringe 121 and the metal foil 10 may be appropriately designed by one of ordinary skill in the art. If the distance between the syringe and the metal foil is too large, the electrode slurry is dropped in a contorted form due to the impact generated as the electrode slurry falls on the metal foil. On the other hand, if the distance between the syringe and the metal foil is too small, there may be an error in measurement as the electrode slurry is pressed down by the syringe. For example, the distance between the syringe and the metal foil may correspond to 2 to 10 times and specifically 2 to 5 times of the thickness of the electrode slurry, but the present disclosure is not limited to these examples.

The vision camera 122 photographs shapes of the electrode slurry 20 dropped by the syringe 121, collects images obtained by photographing the shapes of the electrode slurry 20, and measures a spread degree of the dropped electrode slurry 20 from the photographed images. There is no limitation to the vision camera 122 as long as it can visually sense the shape of the electrode slurry 20 dropped on the metal foil 10 like a CCD camera. The vision camera 122 senses the metal foil shown on an image and at least one of color, brightness, and chroma of the dropped electrode slurry, and measures spread degree of the electrode slurry dropped by the syringe.

Specifically, referring to FIG. 2A, the electrode slurry 20 dropped on the metal foil 10 has a circular shape when looked down at the metal foil 10. When the vision camera 122 measures the spread degree of the electrode slurry 20, the vision camera 122 is positioned on the upper surface of the metal foil 10, specifically the upper surface of the portion where the electrode slurry 20 has been dropped on the metal foil 10, to thereby measure the diameter (d) of the dropped electrode slurry. At this time, the angle between the vision camera 122 and the metal foil may be 90°.

As shown in FIG. 2A, the vision camera 122 converts the photographed image into visual data. To this end, the vision camera 122 may include a predetermined program storage unit for data conversion and calculation, a calculation unit which converts an actual photographing screen into visual data based on the program and calculates the spread degree (diameter) of the electrode slurry from the visual data as a numerical value, and a display unit which displays the visual data and the spread degree on a screen. The vision camera may transmit such visual data and spread degree measurement values to a controller to be described later. The program storage unit, the calculation unit and the display unit may be installed in the controller.

FIGS. 4 and 5 each are a schematic diagram showing an electrode slurry coating apparatus 200 according to another embodiment of the present disclosure.

Referring to FIGS. 4 and 5 together with FIGS. 1 and 2, the remaining oil level measuring unit 120 measures the contact angle of the electrode slurry 20 dropped on the metal foil 10. The contact angle is an angle at which a liquid is thermodynamically in equilibrium on the surface of a solid, and means an angle (θ) at a side including liquid among angles between a solid surface and a tangent line at a contact point of three phases of air, a metal foil and an electrode slurry when an electrode slurry is dropped on a metal foil in the air as shown in FIG. 2B.

As in the above-described spread degree, the contact angle also becomes the criterion for evaluating affinity or wettability of a solid phase material (metal foil) and a liquid phase material (electrode slurry). As described above, when the affinity between the solid phase material and the liquid phase material is high, the liquid phase material is widely spread on the solid phase material. In this case, the contact angle becomes small. On the other hand, when the affinity between the solid phase material and the liquid phase material is low, the liquid phase material is aggregated on a small region, and the contact angle becomes large.

Namely, when the remaining oil level on the surface of the metal foil 10 is large, the affinity between the electrode slurry 20 and the metal foil 10 is low, and accordingly, the contact angle becomes relatively large. On the contrary, when the remaining oil level on the surface of the metal foil 10 is low, the affinity between the electrode slurry 20 and the metal foil 10 becomes large and accordingly, the contact angle decreases. Likewise, according to the present disclosure, it is possible to recognize and control the remaining oil level on the surface of the metal foil from the affinity between the electrode slurry and the metal foil.

Referring to FIGS. 4 and 5, in the electrode slurry coating apparatus 200 according to the present disclosure, the remaining oil level measuring unit 120 includes a syringe 121 and a vision camera 122. The syringe 121 drops an electrode slurry 20 on a metal foil 10 as described above.

The vision camera 122 photographs shapes of the electrode slurry 20 dropped by the syringe, collects images obtained by photographing the shapes of the electrode slurry 20, and measures a contact angle of the dropped electrode slurry 20 from the photographed images. The vision camera 122 senses at least one of color, brightness, and chroma of the dropped electrode slurry 20 and the metal foil 10 shown on an image, and measures spread degree of the electrode slurry dropped by the syringe.

Specifically, referring to FIG. 2B, the electrode slurry 20 dropped on the metal foil 10 has an arc or chord shape when observed in the side surface direction of the metal foil 10. When the vision camera 122 measures the contact angle of the electrode slurry 20, the vision camera 122 is positioned on the side surface of the metal foil 10 and measures the contact angle of the dropped electrode slurry. At this time, the vision camera 122 may be parallel to the surface formed by the metal foil 10.

As shown in FIG. 2B, the vision camera 122 converts the photographed image into visual data. To this end, the vision camera 122 may include a predetermined program storage unit for data conversion and calculation, a calculation unit which converts an actual photographing screen into visual data based on the program and calculates the contact angle of the electrode slurry from the visual data as a numerical value, and a display unit which displays the visual data and the spread degree on a screen. The vision camera 122 may transmit such visual data and contact angle measurement values to a controller to be described later.

Further, in the present disclosure, the remaining oil level measuring unit 120 measures at least one of the spread degree and the contact angle of the electrode slurry 20 dropped on the metal foil 10. At this time, the remaining oil level measuring unit 120 may measure one or both of the spread degree and the contact angle of the electrode slurry 20. In this case, the vision camera 122, which photographs the shape of the electrode slurry, is positioned on the upper surface and the side surface of the metal foil 10, respectively, to thereby measure the spread degree and contact angle of the electrode slurry 20.

Further, in the present disclosure, the measuring of the remaining oil level of the metal foil may be performed right before coating the electrode slurry. This is because the remaining oil level on the surface may change during the process of storing, transferring and processing the metal foil before coating the electrode slurry. Namely, in the present disclosure, the measurement of the remaining oil level and the coating of the electrode slurry may be performed as consecutive processes in one device. For example, in a state that the metal foil 10 is fixed, as the syringe 121, the vision camera 122, and the coater 110 are moved in a coating direction, the remaining oil level is measured by the syringe 121 and the vision camera 122, and the electrode slurry may then be coated by the coater 110. Alternatively, in a state that the syringe 121, the vision camera 122 and the coater 110 are fixed, as the metal foil 10 is transferred in the coating direction, the measurement of the remaining oil level and the coating of the electrode slurry may be sequentially performed. To this end, the syringe 121 and the vision camera 122 are positioned on the upper side of the coater 110 on the basis of the coating direction, and the syringe 121 is positioned on the upper side of the vision camera 122 on the basis of the coating direction. Herein, being positioned on the upper side on the basis of the coating direction means being positioned close to the side where the coating of the electrode slurry has not been relatively formed, based on the transfer direction of the metal foil or the moving direction of the coater, etc.

Likewise, if the remaining oil level on the surface of the metal foil before coating an electrode slurry is measured by the remaining oil level measuring unit 120, the controller 130 determines whether the remaining oil level is excessive.

As explained above, The higher the remaining oil level of the metal foil, the lower the above-described the affinity between the electrode slurry and the metal foil. Hence, as the remaining oil level increases, the contact angle of the electrode slurry increases, and the spread degree decreases. Hence, the controller 130 compares the measured spread degree or contact angle of the electrode slurry with a reference value, and when the spread degree is less than the reference value or the contact angle exceeds the reference value, it is determined that the remaining oil level is excessive. To this end, the controller 130 includes a storage unit which stores a database about preset reference values, a comparison-calculation unit which comparison-calculates values extracted from the database with the measured spread degree or contact angle, and a determination unit which determines a remaining oil level according to the calculation result and determines whether to coat an electrode slurry. Specifically, when the spread degree is less than the reference value or the contact angle exceeds the reference value, the controller 130 determines that the remaining oil level is excessive.

As a result of determination, when the remaining oil level on the surface of the metal foil is within a predetermined range, the controller 130 controls the coater 110 to discharge the electrode slurry. At this time, the controller 130 may order a predetermined moving means (not shown) connected to the coater 110 to move the coater 110.

On the other hand, if the remaining oil level on the surface of the metal foil is excessive as a result of determination, the controller 130 may control the metal foil to be cleaned.

FIG. 6 is a block diagram showing the configuration of an electrode slurry coating apparatus according to further another embodiment of the present disclosure.

Referring to FIG. 6, the electrode slurry coating apparatus 300 according to the present disclosure further includes a cleaning unit 140. There is no particular limitation to the structure of the cleaning unit 140 as long as it can clean the metal foil. The cleaning unit 140, for example, may include a washing tank for accommodating cleaning liquid, a nozzle for spraying cleaning liquid to a metal foil, a cleaning part for washing off the cleaning liquid, and a drying part for drying the metal foil.

The controller 130 may transfer the metal foil, which has been determined to have an excessive remaining oil level on the surface, to the cleaning unit 140 to allow the metal foil to be cleaned, thereby removing the remaining oil on the surface.

Likewise, the same process is repeated for the metal foil from which the remaining oil on the surface has been removed. Namely, the remaining oil level measuring unit 120 remeasures the remaining oil level for the cleaned metal foil, and the controller 130 redetermines whether to coat an electrode slurry on the cleaned metal foil. When the remaining oil level on the surface of the metal foil is within a predetermined range, the controller 130 controls the coater 110 to discharge the electrode slurry, and transfers the metal foil, which has been determined to have an excessive remaining oil level on the surface, to the cleaning unit 140 to allow the metal foil to be cleaned.

Likewise, according to the present disclosure, it is possible to more accurately recognize the remaining oil level on the metal foil by dropping an electrode slurry on a metal foil before coating the electrode slurry and measuring the spread degree and a contact angle of the dropped electrode slurry. Through this, it is possible to prevent the decrease of the quality of the electrode mixture layer formed after the coating of the electrode slurry.

Further, the present disclosure provides a method of coating an electrode slurry. This may be performed by the above-described electrode slurry coating apparatus.

FIG. 7 is a flowchart illustrating an order of an electrode slurry coating method according to the present disclosure.

Referring to FIG. 7, an electrode slurry coating method according to the present disclosure includes: preparing a metal foil for an electrode current collector (S10); measuring a remaining oil level of the metal foil (S20); and determining whether the remaining oil level is excessive from a measurement value of the remaining oil level (S30) and determining whether to coat the electrode slurry therefrom (40).

First, a metal foil is prepared (S10). What has been described above may be used as the metal foil. For example, aluminum may be used. Such a metal foil may be manufactured by a known scheme such as electroplating. The surface of the manufactured metal foil may be planarized through rolling.

When the metal foil is prepared, the remaining oil level on the surface of the metal foil is measured (S20). As described above, during the measuring of remaining oil level of the metal foil, the measuring unit may measure at least one of a spread degree and a contact angle of the electrode slurry dropped on the metal foil.

Further, since the measuring of the remaining oil level of the metal foil is performed right before coating the electrode slurry, the error of the remaining oil level may be reduced. This is because the remaining oil level on the surface may change during the process of storing, transferring and processing the metal foil.

At this time, the remaining oil level of the metal foil may be measured by the remaining oil level measuring unit. Specifically, the measuring of the remaining oil level of the metal foil may be performed by dropping an electrode slurry on the metal foil by the syringe, photographing shapes of the electrode slurry dropped by the syringe using a vision camera, collecting images obtained by photographing the shapes of the electrode slurry, and then measuring at least one of a spread degree and a contact angle of the electrode slurry from the images.

At this time, the vision camera may sense the metal foil and at least one of color, brightness, and chroma of the dropped electrode slurry, and measure a diameter or a contact angle of the electrode slurry dropped by the syringe. The specific process of measuring the spread degree and the contact angle of the electrode slurry is as described above.

When the remaining oil level of the metal foil is measured, it is determined whether the remaining oil level is excessive therefrom (S30). As described above, the higher the remaining oil level on the surface of the metal foil, the higher the contact angle of the electrode slurry, and the lower the spread degree. As such, when the spread degree is less than the reference value or the contact angle exceeds the reference value, it may be determined that the remaining oil level is excessive.

Thereafter, if it is determined whether the remaining oil level is excessive, it is determined whether to coat the electrode slurry therefrom. If the remaining oil level is good, it is determined that an electrode slurry is to be coated, and accordingly, the controller controls the coater to coat an electrode slurry on the metal foil (S40).

On the other hand, if it is determined that the remaining oil level is excessive, the process of cleaning the metal foil (S50) is performed. As such, the metal foil is transferred to the cleaning unit to clean the remaining oil on the surface.

After the cleaning of the metal foil is completed, the process of remeasuring the remaining oil level for the cleaned metal foil and redetermining whether to coat an electrode slurry on the cleaned metal foil is performed. If the remaining oil level is good as a result of remeasurement, the electrode slurry is coated, and if it is determined that the remaining oil level is excessive, the process of cleaning the metal foil is reperformed.

Likewise, according to the present disclosure, it is possible to more accurately recognize the remaining oil level on the metal foil by dropping an electrode slurry on a metal foil before coating the electrode slurry and measuring the spread degree and a contact angle of the dropped electrode slurry. Through this, it is possible to prevent the decrease of the quality of the electrode mixture layer formed after the coating of the electrode slurry.

The above description is merely illustrative of the technical idea of the present disclosure, and those skilled in the art to which the present disclosure pertains may make various modifications and variations without departing from the essential characteristics of the present disclosure. Therefore, the drawings disclosed in the present disclosure are not intended to limit the technical idea of the present disclosure but to describe the present disclosure, and the scope of the technical idea of the present disclosure is not limited by these drawings. The scope of protection of the present disclosure should be interpreted by the following claims, and all technical ideas within the scope equivalent thereto should be construed as being included in the scope of the present disclosure.

On the other hand, in this specification, terms indicating directions such as up, down, left, right, before, and after are used, but it is obvious that these terms are for convenience of description only and may change depending on the location of the object or the location of the observer.

DESCRIPTION OF REFERENCE NUMERALS

10: metal foil
20: electrode slurry
100, 200, 300: electrode slurry coating apparatus
110: coater
120: remaining oil level measuring unit
121: syringe
122: vision camera
130: controller
140: cleaning unit

The invention claimed is:

1. An apparatus for coating an electrode slurry, the apparatus comprising:

a coater configured to coat an electrode slurry on a metal foil;

a measurer configured to measure a remaining oil level on a surface of the metal foil before the coater coats the electrode slurry;

a controller configured to control the coater to coat the electrode slurry based on a measurement value of the remaining oil level on the surface of the metal foil;

a syringe configured to drop an electrode slurry on the metal foil in an amount ranging from 0.1 to 5 mL; and a cleaner configured to clean the metal foil, wherein the controller is configured to control a transfer of the metal foil to the cleaner for cleaning based on a determination that the remaining oil level on the surface is excessive, wherein the measurer comprises a vision camera configured to photograph shapes of the electrode slurry dropped by the syringe, collect images obtained by photographing the shapes of the electrode slurry, and measure at least one of a spread degree or a contact angle of the dropped electrode slurry from the images, and wherein a distance between the syringe and the metal foil is in a range of 2 to 10 times a thickness of a dropped electrode slurry, so as to prevent a measurement error from the dropped electrode slurry being pressed down by the syringe.

2. The apparatus of claim 1, wherein the measurer is configured to measure at least one of a spread degree or a contact angle of the electrode slurry dropped on the metal foil.

3. The apparatus of claim 2, wherein the controller is configured to compare the at least one of the measured spread degree or the measured contact angle with a reference value, and wherein, when the measured spread degree is less than the reference value or the measured contact angle exceeds the reference value, it is determined that the remaining oil level is excessive.

4. The apparatus of claim 1, wherein the vision camera is configured to sense the metal foil on an image and at least one of color, brightness, or chroma of the dropped electrode slurry, and measure a diameter or a contact angle of the dropped electrode slurry.

5. The apparatus of claim 1, wherein, when the remaining oil level on the surface of the metal foil is within a predetermined range, the controller is configured to control the coater to discharge the electrode slurry.

6. The apparatus of claim 1, wherein the remaining oil level measurer is configured to remeasure the remaining oil level for a cleaned metal foil, and wherein the controller is configured to control the coater to discharge the electrode slurry based on the remaining oil level on the surface of the cleaned metal foil.

* * * * *